US005521460A

United States Patent [19]

Zhu

[11] Patent Number: 5,521,460

[45] Date of Patent: May 28, 1996

[54] LAMP BASE LOCKING CLIP

[75] Inventor: Huiling Zhu, Londonderry, N.H.

[73] Assignee: Osram Sylvania Inc., Del.

[21] Appl. No.: 295,136

[22] Filed: Aug. 24, 1994

[51] Int. Cl.$^{6}$ .............................. H01J 5/48; H01J 5/50; F16B 39/00

[52] U.S. Cl. .............................. 313/318.09; 313/318.04; 439/615; 24/563; 411/221

[58] Field of Search ........................ 313/318.01, 318.03, 313/318.04, 318.09, 318.1, 51; 439/611, 615; 24/563, 67.9; 411/198, 202, 203, 211, 221, 316, 317, 322

[56] References Cited

U.S. PATENT DOCUMENTS

| | | | |
|---|---|---|---|
| 1,262,936 | 4/1918 | Fowler . | |
| 2,028,884 | 1/1936 | Thomas | 176/32 |
| 2,157,051 | 5/1939 | Birdseye | 176/32 |
| 4,738,007 | 4/1988 | Demarest, Jr. | 24/563 |
| 5,006,751 | 4/1991 | Marshall | 313/51 |
| 5,381,070 | 1/1995 | Tuttle et al. | 313/318.01 |

FOREIGN PATENT DOCUMENTS 20364 of 1910 Australia .

*Primary Examiner*—Donald J. Yusko
*Assistant Examiner*—Nimesh Patel
*Attorney, Agent, or Firm*—William H. McNeill

[57] ABSTRACT

A lamp base locking clip comprises a first end having a given thickness; an intermediate portion having a thickness at least approximately 3 times said given thickness and a second end having said given thickness. The intermediate portion is defined by opposed, space apart, first and second surfaces, said first end being contiguous with said first surface and said second end being contiguous with said second surface. In a preferred embodiment the clip is formed from a single piece of ribbon material and said intermediate portion is formed by folding said ribbon to have two reentrant portions. The preferred embodiment is especially suited for automation.

12 Claims, 4 Drawing Sheets

LAMP BASE LOCKING CLIP

BACKGROUND OF THE INVENTION

The present invention relates to a lamp base locking clip, a method of making the clip and a lamp base shell assembly which utilizes the clip.

Most lamps utilize lamp base shells to facilitate insertion and removal into a complementary lamp socket, and to establish electrical contact between the lamp and the socket. Several structures have been developed to prevent the lamp base shell from separating from the lamp base, particularly when the lamp is removed from the socket at the end of its useful life. See, for example, U.S. Pat. Nos. 1,262,936; 2,028,884; 2,157,051; and 5,006,751.

In another configuration, a threaded inner shell having a washer-like base and a plurality of orthogonally projecting tabs around the base's periphery is used to secure the lamp base shell. The inner shell's tabs each have a dimple, or indentation, which corresponds with dimples molded in the neck of the lamp base. The inner shell is secured to the lamp base by placing it over the base until the corresponding dimples are mated. Once the inner shell is in place, a lamp base shell is securely screwed onto the inner shell and is staked, or pierced, to engage it with the inner shell. Inner shells are generally made from any non corrosive steel, such as a nickel-iron alloy, to prevent breakdown. Furthermore, lamps typically have two lead wires. A side lead wire is attached to the outer surface of the inner shell prior to the securing and staking of the lamp base shell, for example, by soldering or welding. A center lead wire typically passes through an eyelet where it is attached, also by soldering or welding. This configuration, while securing the lamp base shell, and providing electrical contact, requires several parts and difficult manual assembly, particularly with respect to attaching the side lead wire to the surface of the inner shell. This approach results in costly, time consuming, and inefficient lamp production.

Another method to electrically connect the lamp's lead wires to the lamp base shell, and mechanically secure the base shell to the lamp base, uses a threaded form molded into the lamp glass with a keyway to accommodate a lead solder preform that makes the required electrical connection and locks the base onto the glass.

Although providing sufficient backout torque resistance to meet applicable standards and requirements, and addressing deficiencies of the inner shell technique, use of lead solder has several disadvantages. First, lead solder is an environmental pollutant. Therefore, as environmental laws and regulations continue to impose new and increasingly stringent standards, the lamp industry is attempting to phase out the use of lead solder. Second, the use of lead solder increases both direct and indirect costs associated with lamp production. Lead solder is an expensive material and, further, soldering discolors the brass or copper-nickel alloy base shells typically used in high intensity discharge lamp applications. More expensive nickel-plated base shells must be used to maintain good aesthetics, thereby increasing the overall cost of lamp production.

An attempt to obviate the above disadvantages is shown in U.S. Pat. No. 5,381,070. This approach works well in smaller bulb sizes and eliminates the use of solder; however, it can sometimes fail torque tests in larger size bases, such as the mogul base.

It is, therefore, an object of the invention to obviate the disadvantages of the prior art.

It is another object of the present invention to provide a lamp base locking apparatus and method which is cost effective and provides for an efficient assembly line operation.

It is a further object of the present invention to provide a lamp base locking apparatus and method which is environmentally safe while not increasing lamp manufacturing costs.

DISCLOSURE OF THE INVENTION

These objects are accomplished, in one aspect of the invention, by a lamp comprising a hollow body including a light source, the body terminating in a neck. At least two lead-in wires extend from the neck, and the neck is substantially circular in cross-section and has a longitudinal axis with a given circumference about the axis. A keyway is formed in the neck parallel to the axis and has a circumferential extent less than the given circumference. A lamp base locking clip is positioned in the keyway. The locking clip has a first end having a given thickness, an intermediate portion having a thickness approximately 3 times the given thickness, and a second end having the given thickness. A first of the lead-in wires is electrically connected to the first end of the clip. A lamp base shell having first and second electrically conductive portions separated by an insulator is fitted on the neck and the first portion of the lamp base shell is electrically connected to the clip. The other of the lead-in wires is electrically connected to the second electrically conductive portion.

With the locking clip fixed in the keyway and the lamp base shell welded thereto, the assembly will remain in place when subjected to sufficient backout torque resistance to meet applicable standards.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
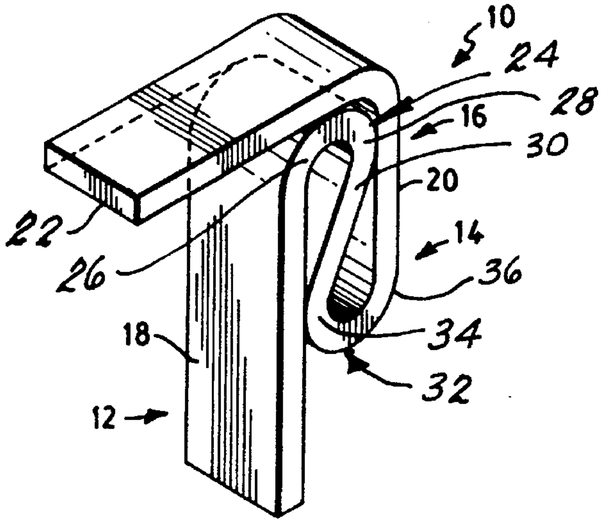
FIG. 1 is a perspective view of an embodiment of a clip of the invention.

Referring now to the drawings with greater particularity, there is shown in FIG. 1 a lamp base locking clip 10 including a first end 12 having a given thickness, an intermediate portion 14 having a thickness at least approximately three times the given thickness and a second end 16 having a thickness equal to the given thickness. The intermediate portion 14 is defined by opposed, spaced apart, first and second surfaces, 18, 20, respectively. The first end 12 is contiguous with the first surface 18 and the second end 16 is contiguous with the second surface 20. A projecting lip 22 extends from the second end 16 in a direction substantially normal thereto.

Clip 10 is preferably formed from annealed, 316 stainless steel having a thickness of 0.4572 mm (0.018") and a width of 6.4 min. In the preferred embodiment shown in FIG. 1 the clip 10 is formed from a single piece of material in a process to be described hereinafter. As formed, the intermediate portion 14 comprises a first reentrant section 24 which is attached at one 26 thereof to the first end 12 and attached at a second end 28 thereof to an in-between member 30 and a second reentrant section 32 attached at one end 34 thereof to the in-between member 30 and at a second end 36 thereof to the second end 16. In this particular instance the intermediate portion 14 has a thickness approximately five times the given thickness. The additional amount of thickness increase comes from the spaces formed by the reentrant sections.

Figure 2:
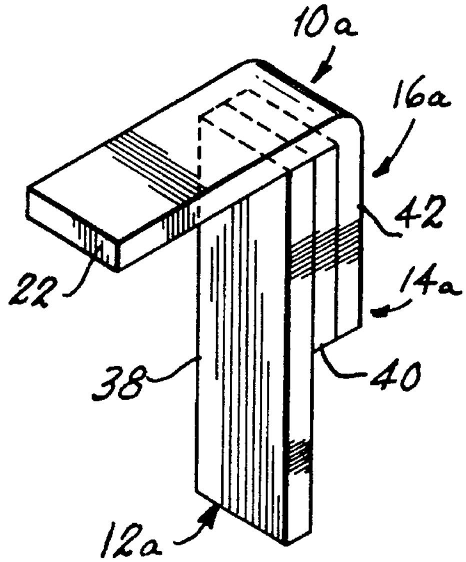
FIG. 2 is a perspective view of an alternate embodiment of a clip of the invention.

An alternate embodiment of the locking clip is shown in FIG. 2 wherein a clip **10*a* has a first end 12*a*, a second end 16*a* and an intermediate portion 14*a* which comprises an area 38 of first end 12*a*, a filler member 40, and an area 42 of second end 16*a***. The elements can be welded together and, in this instance, the thickness of the intermediate portion is about three times the given thickness.

Figure 3:
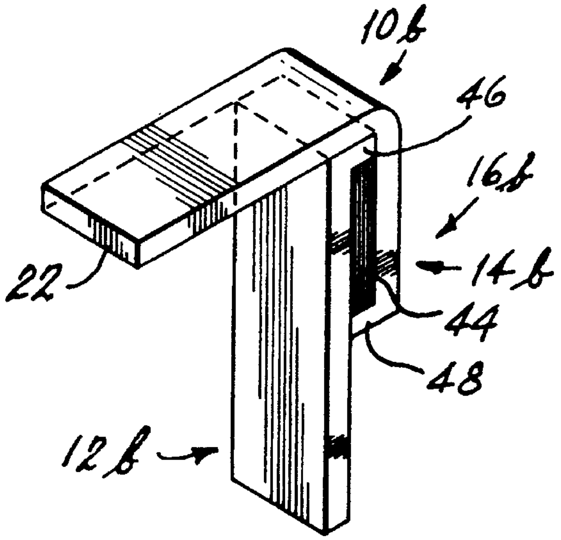
FIG. 3 is a perspective view of another alternate embodiment of a clip of the invention.

Yet another embodiment is shown in FIG. 3 wherein a clip **10*b* has an intermediate portion 14*b* comprised of a hollow space 44 defined by a right-angled bend 46 on first end 12*b* and a right-angled bend 48 on second end 16*b***. The pieces are preferably welded together.

Figure 4:
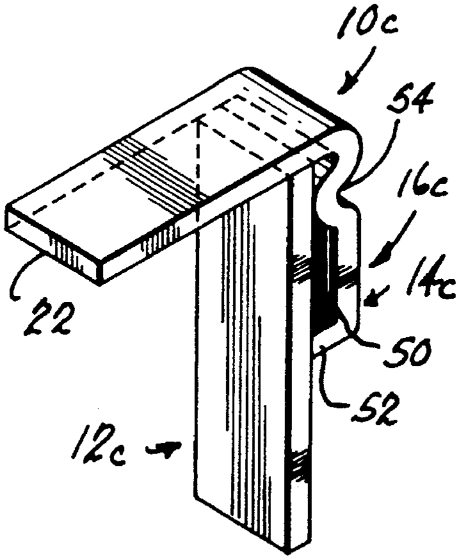
FIG. 4 is a perspective view of yet another alternate embodiment of a clip of the invention.

Still another embodiment is shown in FIG. 4 wherein a clip **10*c* has an intermediate portion 14*c* comprised of a hollow space 50 defined by a right-angled bend 52 and a lateral rib 54 formed on one of said ends, in this instance second end 16*c*. First end 12*c* is unformed and comprises a straight, rectangular element and is preferably welded to second end 16*c***.

Figure 5:
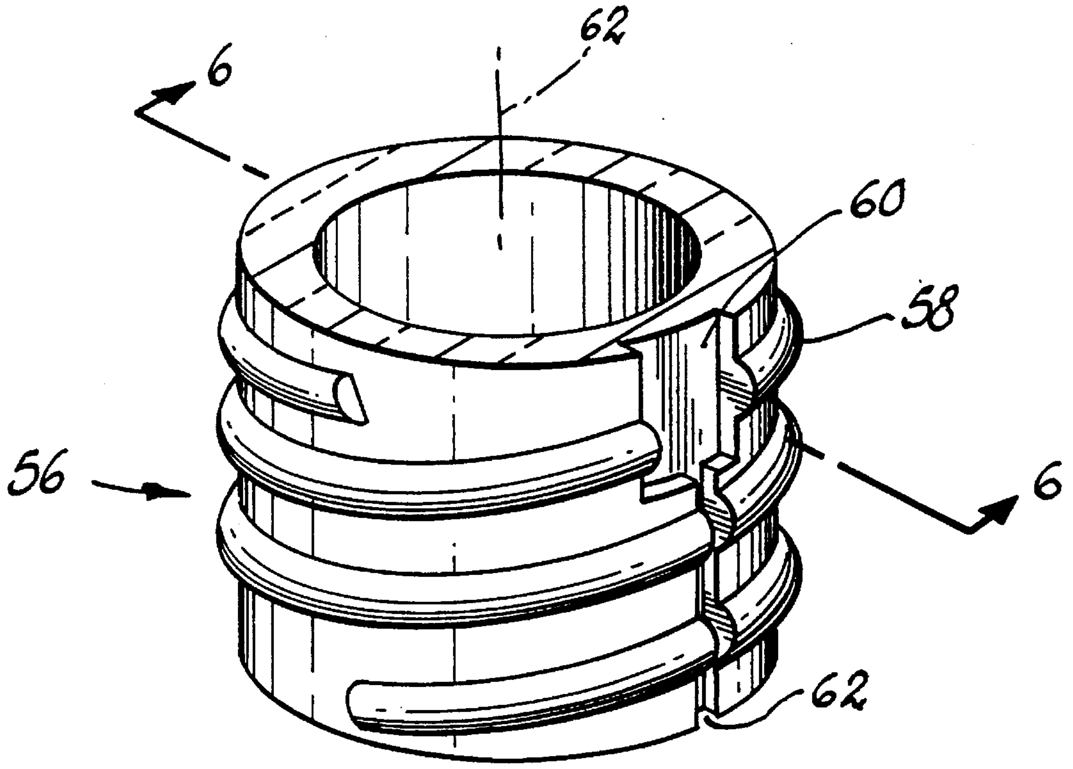
FIG. 5 is a perspective view of a lamp neck, partially in section.

Referring now to FIG. 5, there is shown a section of a lamp neck 56 which has threads 58 formed thereon and a keyway 60 formed therein. The keyway 60 is parallel to the longitudinal axis 62 of the neck and the neck has a given circumferential extent. As will be seen from the illustration, the circumferential extent of the keyway is substantially less than the circumferential extent of the neck and, preferably, should be less than 10 per cent. The keyway 60 can be formed in a uniform width its entire length or, as shown, it can have a narrow, lead-in wire receiving groove 62. The depth of the keyway should be as deep as possible to receive an intermediate portion of a locking clip, consistent with the integrity requirements of the glass of the lamp envelope.

Figure 6:
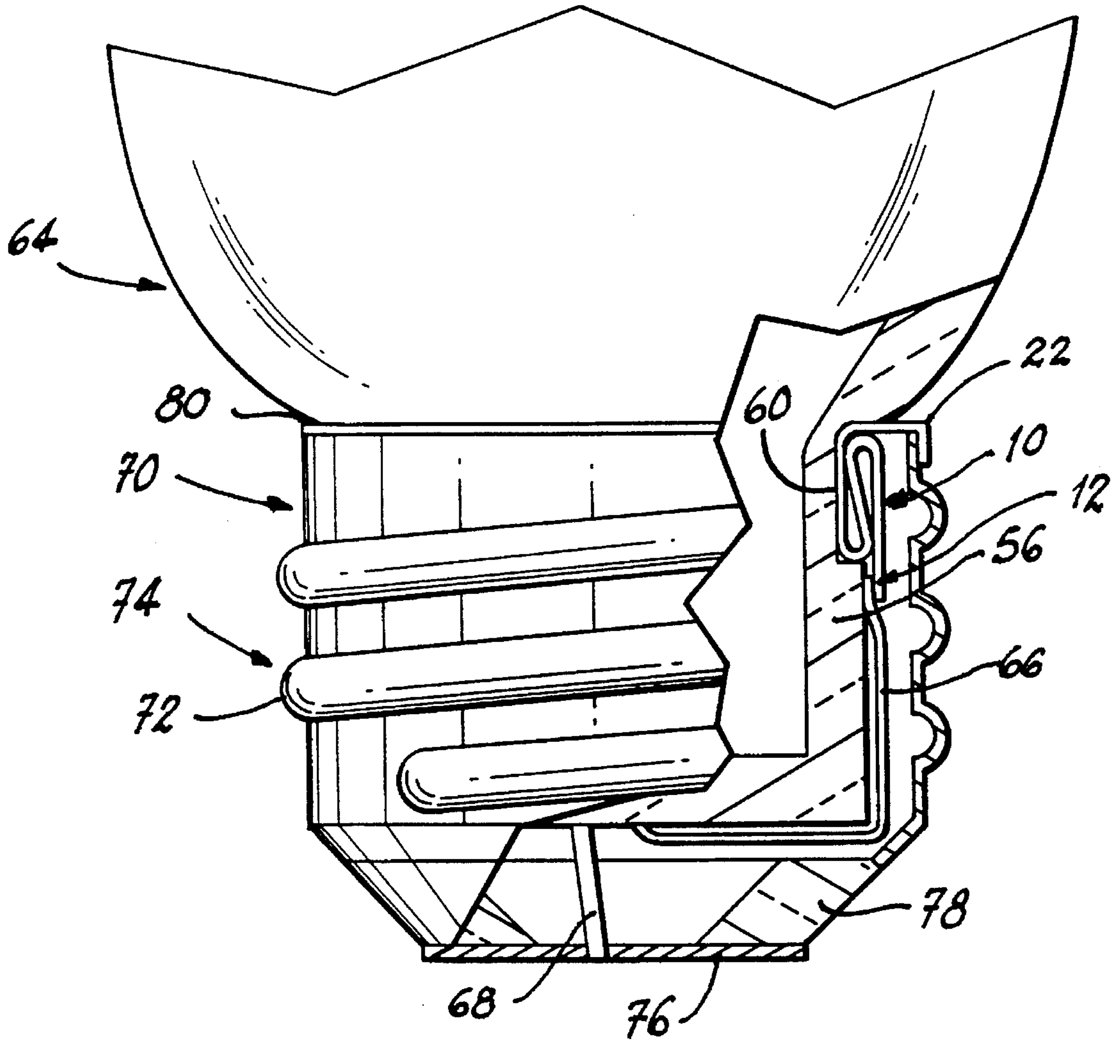
FIG. 6 is an elevational view, partially in section, of a lamp of the invention.

Referring to FIG. 6, the lamp body 64 is shown with its dependent neck 56 having at least two lead-in wires 66, 68 extending therefrom.

A lamp base shell 70 is fitted, as by threads 72, thereover. The lamp base shell includes a first electrically conductive portion 74 and a second electrically conductive portion 76 separated by an insulator 78.

The first lead-in wire 66 is electrically connected as by welding to the first end 12 of clip 10 which has intermediate portion 14 inserted into the keyway 60. The other of the lead-in wires, 68, is electrically connected, as by welding, to the second electrically conductive portion 76, after the lamp base shell 70 is affixed to the lamp neck. This fixing is accomplished by positioning the clip 10 in the keyway 60 and screwing the lamp base shell 70 over the threads 72 formed on the neck until tight at which time the lip 22 will be in contact with the rim 80 on the shell 70. The lip 22 is then bent over the rim and welded to the rim, completing the assembly and providing a rugged and economical base that avoids the use of lead-based solder. Further, this locking clip has increased torque strength over previous designs, including those shown in the above-identified application.

Figure 7:
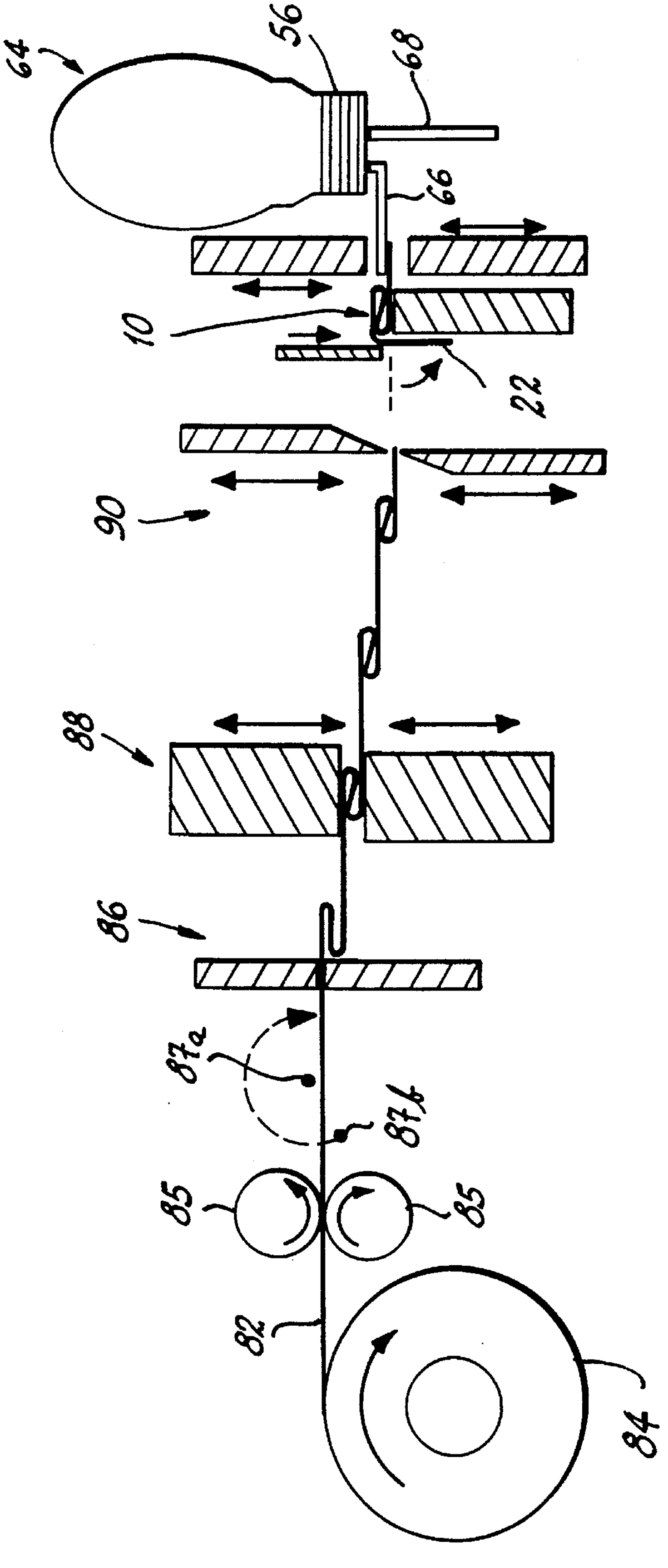
FIG. 7 is a diagrammatic view of a method of constructing the clip of FIG. 1.

A method of making the clip 10 is shown diagramatically in FIG. 7. The method comprises the steps of feeding a ribbon 82 of clip material from a supply 84 thereof to a first workstation 86 where the first and second reentrant sections 24 and 36 are formed. At the first workstation a pair of braking wheels 85 slippingly hold the ribbon 82 while spaced therefrom a clamping medium **86*a* fixedly grasps the ribbon. A bifurcated forming tool having times 87*a*, 87*b* engages the ribbon and is rotated 90°, thereby forming the reentrant portions, and is then retracted. The ribbon is advanced to a second workstation 88 where compression is applied to the reentrant sections. The ribbon is then advanced to a third workstation 90 for cutting. If desired, the cut ribbon may be held at the third workstation, have the projecting tip 22 formed thereat and have a lead-in wire 66 welded to the first end 12**.

The ribbon 82, which, as has been noted herein is 316 stainless steel which has been annealed to reduce the spring-back tendency is easily fed through the entire operation. The compression step performed at the second workstation 88 also reduces spring-back tendencies and can further be employed to control the thickness of the intermediate portion 14.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A lamp comprising: a hollow body including a light source, said body terminating in a neck; at least two lead-in wires extending from said neck, said neck being substantially circular in cross-section and having a longitudinal axis with a given circumference about said axis; a keyway formed in said neck parallel to said axis and having a circumferential extent less than said given circumference; a lamp base locking clip positioned in said keyway, said locking clip having a first end having a given thickness, an intermediate portion having a thickness at least approximately 3 times said given thickness, and a second end having said given thickness; a first of said lead-in wires being electrically connected to said first end of said clip; a lamp base shell having first and second electrically conductive portions separated by an insulator fitted on said neck, said first portion of said lamp base shell being electrically connected to said clip; and the other of said lead-in wires being electrically connected to said second electrically conductive portion.

2. The lamp of claim 1 wherein said intermediate portion is defined by opposed, space apart, first and second surfaces, said first end being contiguous with said first surface and said second end being contiguous with said second surface.

3. The lamp of claim 2 wherein said first portion of said lamp base shell is electrically connected to said clip by a weld formed between said shell and said second end.

4. The lamp of claim 2 wherein said neck is threaded and said lamp base shell is threaded onto said neck.

5. The lamp of claim 4 wherein said lamp base shell is attached to said second end of said locking clip by a weld.

6. A locking clip comprising: a first end having a given thickness; an intermediate portion having a thickness approximately 3 times said given thickness and a second end having said given thickness; said intermediate portion being defined by opposed, space apart, first and second surfaces, said first end being orthogonal to said second end and contiguous with said first surface and said second end being contiguous with said second surface.

7. The locking clip of claim 6 wherein said intermediate portion comprises: a first reentrant section attached at one end to said first end and attached at a second end to an in-between member; and a second reentrant section attached to said in-between member and said second end.

8. The locking clip of claim 6 wherein said intermediate portion comprises: and area of said first end; a filler member; and an area of said second end.

9. The locking clip of claim 6 wherein said intermediate portion comprises: a hollow space defined by a right angled bend on said first end and said second end.

10. The locking clip of claim 6 wherein said intermediate portion comprises: a hollow space defined by a right angled bend formed on one of said ends and a rib formed on said one of said ends.

11. A locking clip comprising: a first end having a given thickness; an intermediate portion having a thickness approximately 3 times said given thickness and a second end having said given thickness; said intermediate portion being defined by opposed, space apart, first and second surfaces, said first end being contiguous with said first surface and said second end being contiguous with said second surface, said intermediate portion comprising a hollow space defined by a right angled bend on said first end and said second end.

12. A locking clip comprising: a first end having a given thickness; an intermediate portion having a thickness approximately 3 times said given thickness and a second end having said given thickness; said intermediate portion being defined by opposed, space apart, first and second surfaces, said first end being contiguous with said first surface and said second end being contiguous with said second surface, said intermediate portion comprising a hollow space defined by a right angled bend formed on one of said ends and a rib formed on one of said ends.

* * * * *